(12) United States Patent
Sonoda et al.

(10) Patent No.: US 10,866,574 B2
(45) Date of Patent: Dec. 15, 2020

(54) MACHINE TOOL CONTROLLER WITH LEARNING ERROR COMPENSATION

(71) Applicant: FANUC CORPORATION, Yamanashi (JP)

(72) Inventors: Naoto Sonoda, Yamanashi (JP); Tomohiko Kawai, Yamanashi (JP); Haruhisa Yago, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 140 days.

(21) Appl. No.: 16/172,181

(22) Filed: Oct. 26, 2018

(65) Prior Publication Data
US 2019/0163161 A1 May 30, 2019

(30) Foreign Application Priority Data
Nov. 27, 2017 (JP) .................................. 2017-227018

(51) Int. Cl.
*G05B 19/402* (2006.01)
*G05B 13/02* (2006.01)

(52) U.S. Cl.
CPC ........ *G05B 19/402* (2013.01); *G05B 13/0265* (2013.01); *G05B 2219/37077* (2013.01); *G05B 2219/49113* (2013.01)

(58) Field of Classification Search
CPC .............. G05B 19/402; G05B 13/0265; G05B 2219/37077; G05B 2219/49113
See application file for complete search history.

(56) References Cited

U.S. PATENT DOCUMENTS

| 4,031,368 A * | 6/1977 | Colding | G05B 19/4163 |
| | | | 700/173 |
| 6,038,489 A * | 3/2000 | Pickles | G05B 19/184 |
| | | | 29/888.08 |

(Continued)

FOREIGN PATENT DOCUMENTS

| JP | 49-5878 | 2/1974 |
| JP | 50-30313 | 9/1975 |

(Continued)

OTHER PUBLICATIONS

Notification of Reasons for Refusal dated Nov. 19, 2019 in corresponding Japanese Patent Application No. 2017-227018, with English-language translation.

*Primary Examiner* — Bernard G Lindsay
(74) *Attorney, Agent, or Firm* — Wenderoth, Lind & Ponack, L.L.P.

(57) ABSTRACT

A machine tool controller includes: a servo control unit that generates a positional error based on a difference between a position command for moving a tool and a present position of the tool and generates a drive command for a motor that moves the tool based on the positional error; and a displacement meter that measures a machining surface displacement amount of the workpiece. The servo control unit includes: a compensation amount calculating unit that calculates a shape error of the workpiece with respect to a desired shape for each rotation angle of the workpiece based on the measured machining surface displacement amount and obtains a compensation amount of the positional error based on the calculated shape error of the workpiece; and a first compensation unit that compensates the positional error for each rotation angle of the workpiece based on the calculated compensation amount.

4 Claims, 2 Drawing Sheets

(56) References Cited

U.S. PATENT DOCUMENTS

| | | | | |
|---|---|---|---|---|
| 6,590,358 B1* | 7/2003 | Tsutsui | ............... | G05B 5/01 |
| | | | | 318/560 |
| 2002/0066197 A1* | 6/2002 | Sano | ............... | B24B 49/00 |
| | | | | 33/549 |
| 2004/0029690 A1* | 2/2004 | Takaku | ............... | B23Q 17/003 |
| | | | | 483/7 |
| 2008/0060491 A1* | 3/2008 | Hyatt | ............... | B23Q 39/026 |
| | | | | 82/118 |
| 2016/0033954 A1* | 2/2016 | Sonoda | ............... | G05B 19/402 |
| | | | | 318/573 |

FOREIGN PATENT DOCUMENTS

| | | |
|---|---|---|
| JP | 55-42773 | 3/1980 |
| JP | 63-237866 | 10/1988 |
| JP | 2-97546 | 8/1990 |
| JP | 4-323705 | 11/1992 |
| JP | 5-57564 | 3/1993 |
| JP | 6-8105 | 1/1994 |
| JP | 2007-206857 | 8/2007 |
| JP | 2016-31735 | 3/2016 |
| JP | 2017-132000 | 8/2017 |

* cited by examiner

MACHINE TOOL CONTROLLER WITH LEARNING ERROR COMPENSATION

This application is based on and claims the benefit of priority from Japanese Patent Application No. 2017-227018, filed on 27 Nov., 2017, the content of which is incorporated herein by reference.

BACKGROUND OF THE INVENTION

Field of the Invention

The present invention relates to a machine tool controller that relatively moves a workpiece or a tool while rotating the workpiece or the tool to perform machining of the workpiece.

Related Art

For example, a machine tool that performs turning or grinding on a columnar or cylindrical workpiece is known. In such the machine tool, the work piece or a tool is moved using a motor while rotating the workpiece to bring the workpiece and the tool into contact with each other, thereby performing machining of the workpiece. Patent Documents 1 to 3 disclose a controller that controls a relative position between a work and a tool by controlling a motor in such a machine tool.

In the above-described machine tool, machining accuracy may decrease due to a shape error (for example, an eccentricity of the center of the columnar or cylindrical workpiece with respect to a rotary axis of the workpiece), an attachment error of the workpiece, or the like. Moreover, for example, in a machine tool that rotates a disk-shaped tool (a grindstone), machining accuracy may decrease due to a shape error (for example, an error of the center of the disk-shaped tool with respect to a rotary axis of the tool) or an attachment error of the tool. In this regard, in the controller disclosed in Patent Documents 1 to 3, a shape error, an attachment error of the workpiece, or the like is measured after machining, the tool is moved back and forth so as to compensate a shape error, an attachment error of the workpiece measured during subsequent machining, or the like to suppress decrease in machining accuracy.

Patent Document 1: Japanese Unexamined Patent Application, Publication No. H05-57564
Patent Document 2: Japanese Unexamined Patent Application, Publication No. S63-237866
Patent Document 3: Japanese Unexamined Patent Application, Publication No. H2017-132000

SUMMARY OF THE INVENTION

According to the controller disclosed in Patent Documents 1 to 3, when the shape error, the attachment error of the workpiece, or the like is measured after machining is performed once and is compensated during the subsequent machining, the machining time increases.

An object of the present invention is to provide a machine tool controller capable of suppressing decrease in machining accuracy and suppressing increase in machining time.

(1) A machine tool controller (for example, a machine tool controller 1 to be described later) according to an aspect of the present invention is a machine tool controller that relatively moves a workpiece (for example, a workpiece W to be described later) or a tool (for example, a tool T to be described later) while rotating the workpiece to perform machining of the workpiece, the machine tool controller including: a servo control unit (for example, a servo control unit 10 to be described later) that generates a positional error based on a difference between a position command for moving the workpiece or the tool so that the workpiece is machined in a desired shape and a present position of the workpiece or the tool and generates a drive command for a driving unit (for example, a motor 5 to be described later) that moves the workpiece or the tool on the basis of the positional error; and a displacement meter (for example, a displacement meter 40 to be described later) that measures a machining surface displacement amount of the workpiece for each rotation angle of the workpiece, wherein the servo control unit includes: a compensation amount calculating unit (for example, a compensation amount calculating unit 14 to be described later) that calculates a shape error of the workpiece with respect to the desired shape for each rotation angle of the workpiece on the basis of the machining surface displacement amount measured by the displacement meter and obtains a compensation amount of the positional error on the basis of the calculated shape error of the workpiece; and a first compensation unit (for example, a first compensation unit 18 to be described later) that compensates the positional error for each rotation angle of the workpiece on the basis of the compensation amount calculated by the compensation amount calculating unit.

(2) A machine tool controller (for example, a machine tool controller 1 to be described later) according to another aspect of the present invention is a machine tool controller that relatively moves a workpiece (for example, a workpiece W to be described later) or a tool (for example, a tool T to be described later) while rotating the workpiece and the tool to perform machining of the workpiece, the machine tool controller including: a servo control unit (for example, a servo control unit 10 to be described later) that generates a positional error based on a difference between a position command for moving the workpiece or the tool so that the workpiece is machined in a desired shape and a present position of the workpiece or the tool and generates a drive command for a driving unit (for example, a motor 5 to be described later) that moves the workpiece or the tool on the basis of the positional error; and a displacement meter (for example, a displacement meter 40 to be described later) that measures a surface displacement amount of the tool for each rotation angle of the workpiece, wherein the servo control unit includes: a compensation amount calculating unit (for example, a compensation amount calculating unit 14 to be described later) that calculates a shape error of the tool with respect to the desired shape for each rotation angle of the workpiece on the basis of the surface displacement amount measured by the displacement meter and obtains a compensation amount of the positional error on the basis of the calculated shape error of the tool; and a first compensation unit (for example, a first compensation unit 18 to be described later) that compensates the positional error for each rotation angle of the workpiece on the basis of the compensation amount calculated by the compensation amount calculating unit.

(3) In the machine tool controller according to (2), a rotation speed of the tool may be an integer multiple of a rotation speed of the workpiece.

(4) in the machine tool controller according to any one of (1) to (3), the servo control unit may further include: a storage unit (for example, a storage unit 16 to be described later) that stores the compensation amount for each rotation angle of the workpiece calculated by the compensation amount calculating unit, the compensation amount corresponding to one rotation of the workpiece, and the first compensation unit may compensate the positional error on the basis of the compensation amount before one rotation or the workpiece stored in the storage unit.

(5) In the machine tool controller according to any one of (1) to (4), the servo control unit may include: a learning control unit (for example, a learning control unit 20 to be described later) that generates a learning compensation amount by performing learning control so that the positional error decreases on the basis of the positional error compensated by the first compensation unit, the learning compensation amount before one rotation or the workpiece, and the rotation angle of the workpiece; and a second compensation unit (for example, a second compensation unit 30 to be described later) that compensates the positional error compensated by the first compensation unit on the basis of the learning compensation amount learnt by the learning control unit.

According to the present invention, it is possible to provide a machine tool controller capable of suppressing decrease in machining accuracy and suppressing increase in machining time.

DETAILED DESCRIPTION OF THE INVENTION

Figure 1:
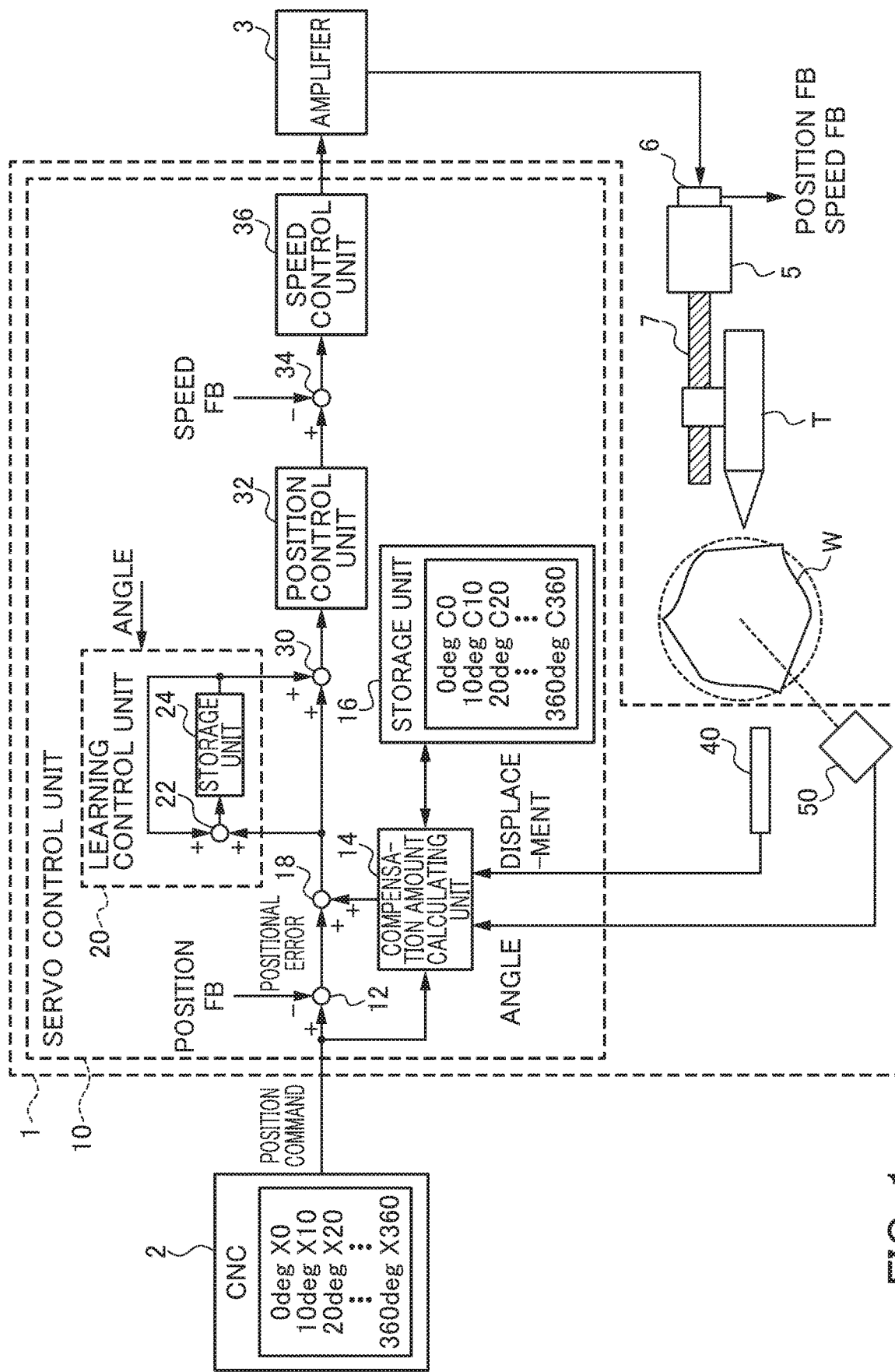
FIG. 1 is a diagram illustrating a configuration of a machine tool controller according to a first embodiment.

Hereinafter, an example of an embodiment of the present invention will be described with reference to the accompanying drawings. The same or corresponding portions in the respective drawings will be denoted by the same reference numerals.

First Embodiment

FIG. 1 is a diagram illustrating a configuration of a machine tool controller according to a first embodiment, in FIG. 1 a machine tool is a machine tool that performs turning or grinding on a workpiece W having a columnar or cylindrical (including perfect circular or elliptical) shape. In this machine tool, a tool T is moved using a motor (a driving unit) 5 while rotating a workpiece W to bring the workpiece W and the tool T into contact with each other to perform machining of the workplace W.

In the present embodiment, the motor 5 moves the tool T with the aid of a ball screw 7. Means for converting rotational movement of the motor 5 to linear movement of the tool T is not limited to the bail screw 7 but may be a hydraulic pump, for example.

An encoder (a position detector, a speed detector) 6 is provided in the motor 5. The encoder 6 detects a rotating position of the motor 5. Since the rotating position of the motor 5 corresponds to the position of the tool T, the encoder 6 detects the position of the tool T. The detected position is used as a position feedback (position FB). Moreover, the encoder 6 detects a rotation speed of the motor 5. Since the rotation speed of the motor 5 corresponds to the movement speed of the tool T, the encoder 6 detects the movement speed of the tool T. The detected speed is used as a speed feed back (speed FB). Means for detecting the position and the speed of the tool T is not limited to the encoder 6, but may be a scale provided near the tool T, for example.

The controller 1 illustrated in FIG. 1 controls a relative position between the workpiece W and the tool T by controlling the motor 5 that moves the tool T of the machine tool on the basis of a position command supplied from a numerical controller (CNC) 2, for example.

The numerical controller 2 generates a position command for moving the tool T by each rotation angle (for example, 10 degrees) of the workpiece W so that the workpiece W is machined in a desired shape.

The controller 1 includes a servo control unit 10, a displacement meter 40, and an angular sensor 50. The servo control unit 10 generates a current command (a drive command) for driving the motor 5 on the basis of a position command from the numerical controller 2 and a position feedback (the present position of the tool T) and a speed feedback from the encoder 6. The current command is amplified by an amplifier 3 and is supplied to the motor 5. The details of the servo control unit 10 will be described later.

The displacement meter 40 measures a displacement amount of a machining surface (for example, an outer surface or an inner surface) of the workpiece W every predetermined time. The predetermined time is a time obtained by dividing a period required for the workpiece W to make one rotation into a plurality of periods (for example, the predetermined time is set to a period required for the workpiece W to rotate 10 degrees). In this way, the displacement meter 40 measures a machining surface displacement amount of the workpiece W for each rotation angle of the workpiece W. As an example of the displacement meter 40, a displacement meter which uses laser, for example, may be used.

The angular sensor 50 detects a rotation angle of the workpiece W every predetermined time. The angular sensor 50 may be omitted. In this case, the rotation angle of the workpiece W may be obtained from an encoder provided in a motor that rotates and drives the workpiece W or from information from a control unit that controls driving of the motor.

Hereinafter, the servo control unit 10 will be described. The servo control unit 10 includes a subtractor 12, a compensation amount calculating unit 14, a storage unit 16, a first compensation unit 18, a learning control unit 20, a second compensation unit 30, a position control unit 32, a subtractor 34, and a speed control unit 36.

The subtractor 12 generates a positional error on the basis of a difference between the position command and the position feedback from the encoder 6.

The compensation amount calculating unit 14 acquires the position command, the machining surface displacement amount of the workpiece W measured by the displacement meter 40, and the rotation angle of the workpiece W detected by the angular sensor 50 and temporarily stores the position command and the rotation angle and the machining surface displacement amount of the workpiece W in the storage unit 16 in correlation. The compensation amount calculating unit 14 calculates a shape error of the workpiece W with respect to a desired shape indicated by the position command for each rotation angle of the workpiece W on the basis of the position command corresponding to one rotation of the workpiece W and the machining surface displacement amount of the workpiece W stored in the storage unit 16. The shape error of the workpiece W includes an eccentricity amount of the center of the columnar or cylindrical workpiece W with respect to the rotary axis of the workpiece W, for example. When the workpiece W has a perfect circular shape, the compensation amount calculating unit 14 may calculate the shape error of the workpiece W on the basis of the machining surface displacement, amount of the workpiece W measured by the displacement meter 40 only without taking the desired shape indicated by the position command into consideration.

The compensation amount calculating unit 14 obtains a compensation amount of the positional error on the basis of the calculated shape error of the workpiece W. The compensation amount calculating unit 14 temporarily stores the obtained compensation amount for each rotation angle corresponding to one rotation of the workpiece W in the storage unit 16.

As described above, the storage unit 16 stores the position command and the rotation angle and the machining surface displacement amount of the workpiece W in correlation. Moreover, the storage unit 16 stores the compensation amount for each rotation angle corresponding to one rotation of the workpiece W calculated by the compensation amount calculating unit 14. The storage unit 16 is a rewritable memory such as EEPROM, for example.

The first compensation unit 18 compensates the positional error generated by the subtractor 12 for each rotation angle of the workpiece W on the basis of the compensation amount before one rotation of the workpiece W calculated by the compensation amount calculating unit 14 and stored in the storage unit 16. For example, the first compensation unit 18 may add the compensation amount to the positional error. Alternatively, the first compensation unit 18 may subtract the compensation amount from the positional error.

The learning control unit 20 generates a learning compensation amount corresponding to one rotation of the workpiece W by performing learning control so that the processes decreases on the basis of the positional error compensated by the first compensation unit 18, the learning compensation amount before one rotation of the workpiece W, and the rotation angle of the workpiece W detected by the angular sensor 50. Specifically, the learning control unit 20 includes an adder 22 and a storage unit 24. The storage unit 24 is a rewritable memory such as EEPROM, for example. The learning compensation amount generated previously is stored in the storage unit 24. The adder 22 generates a learning compensation amount for further decreasing the positional error by adding the present positional error compensated by the first compensation unit 18 to the previous learning compensation amount stored in the storage unit 24 and stores the learning compensation amount in the storage unit 24 in this case, the learning control unit 20 outputs the previous learning compensation amount stored in the storage unit 21 (that is, the learning compensation amount before one rotation of the workpiece W) to the second compensation unit 30.

The second compensation unit 30 compensates the positional error compensated by the first compensation unit 18 for each rotation angle of the workpiece W on the basis of the learning compensation amount before one rotation of the workpiece W learnt by the learning control unit 20. For example, the second compensation unit 30 may add the learning compensation amount to the positional error. Alternatively, the second compensation unit 30 may subtract the learning compensation amount from the positional error.

The position control unit 32 multiplies the positional error compensated by the second compensation unit 30 by a position gain to generate a speed command.

The subtractor 34 generates a speed error on the basis of the speed command generated by the position control unit 32 and the speed feedback detected by the encoder 6.

The speed control unit 36 multiplies the speed error generated by the subtractor 34 by a speed gain to generate a current command (a torque command).

The above-described controller 1 (excluding the storage units 16 and 24) is configured as an arithmetic processor such as, for example, a digital signal processor (DSP) or a field-programmable gate array (FPGA). The functions of the controller 1 (excluding the storage units 16 and 24) are realized by executing predetermined software (program) stored in a storage unit, for example. The functions of the controller 1 (excluding the storage units 16 and 24) may be realized by cooperation of hardware and software and may be realized by hardware (electronic circuits) only.

As described above, in the machine tool controller 1 of the first embodiment, the displacement meter 40 measures the machining surface displacement amount or the workpiece W inside the machine tool for each rotation angle of the workpiece W. Moreover, the servo control unit 10 capable of performing relatively high-speed control calculates a shape error of the workpiece W with respect to a desired workpiece shape for each rotation angle of the workpiece W on the basis of the machining surface displacement amount of the workpiece W measured by the displacement meter 40, obtains a compensation amount of the positional error on the basis of the calculated shape error of the workpiece W, and compensates the positional error for each rotation angle of the workpiece W on the basis of the calculated compensation amount. In this way, the controller 1 can compensate the positional error on a real-time basis during machining of the workpiece W. Specifically, the servo control unit 10 stores the calculated. compensation amount for each rotation angle corresponding to one rotation of the workpiece W during machining of the workpiece W and compensates the positional error on the basis of the stored compensation amount before one rotation of the workpiece W on a real-time basis. Due to this, according to the controller 1, it is possible to suppress decrease in machining accuracy of the machine tool resulting from an attachment error, a shape error (for example, an eccentricity of the center of the columnar or cylindrical workpiece W with respect to the rotary axis of the workpiece W) of the workpiece W, or the like and to suppress increase in machining time.

Moreover, according to the machine tool controller 1 of the first embodiment, the learning control unit 20 and the second compensation unit 30 perform learning control so that the positional error decreases and further compensates the positional error on the basis of the learning compensation amount before one rotation of the workpiece W on a real-time basis. Therefore, it is possible to further suppress decrease in the machining accuracy of the machine tool resulting from an attachment error or a shape error of the workpiece W.

Second Embodiment

In the first embodiment, the machine tool controller 1 for suppressing decrease in machining accuracy resulting from an attachment error and a shape error (for example, an eccentricity of the center of the columnar or cylindrical workpiece W with respect to the rotary axis of the workpiece W) of the workpiece W has been described. In a second embodiment, a machine tool controller for suppressing decrease in machining accuracy resulting from an attachment error and a shape error (for example, an error of the center of a disk-shaped tool T with respect to the rotary axis of the tool T) of the tool T will be described.

Figure 2:
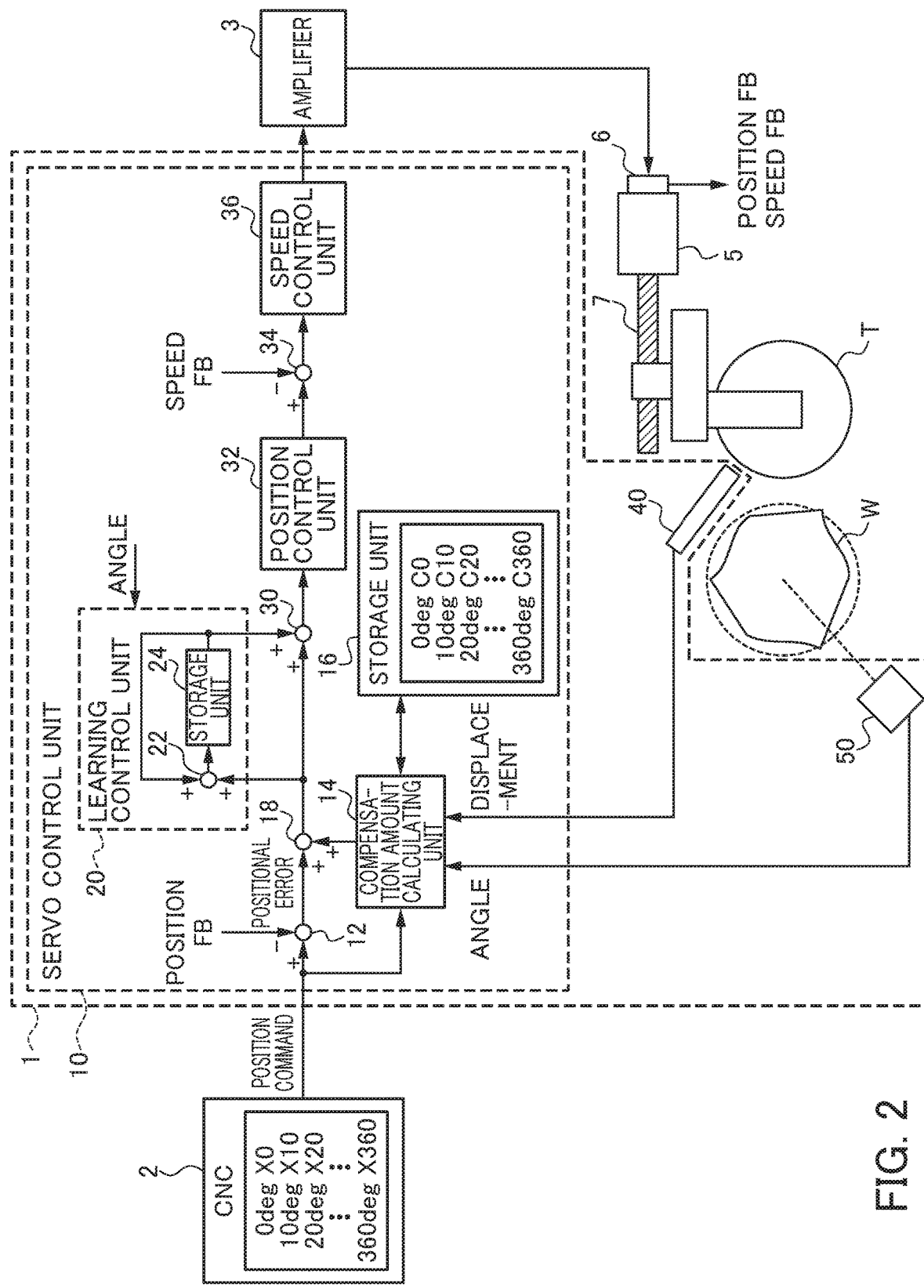
FIG. 2 is a diagram illustrating a configuration of a machine tool controller according to a second embodiment.

FIG. 2 is a diagram illustrating a configuration of a machine tool controller according to a second embodiment. The machine tool illustrated in FIG. 2 is different from that of the first embodiment in that the machine tool includes a disk-shaped tool (for example, a grindstone) T instead of the tool T of the machine tool illustrated in FIG. 1. The tool T is rotated and driven, and the rotation speed of the tool T is set to an integer multiple of the rotation speed of the workpiece W.

In the controller 1 of the second embodiment illustrated in FIG. 2, the functions and the operations of the displacement meter 40, the compensation amount calculating unit 14, the storage unit 16, and the first compensation unit 18 are different from those of the controller 1 of the first embodiment illustrated in FIG. 1.

The displacement meter 40 measures a surface displacement amount of the tool T every predetermined time. The predetermined time is a time obtained by dividing a period required for the workpiece W to make one rotation into a plurality of periods (for example, the predetermined time is set to a period required for the workpiece W to rotate 10 degrees). In this way, the displacement meter 40 measures a surface displacement amount of the tool T for each rotation angle of the workpiece W.

The compensation amount calculating unit 14 acquires the position command, the surface displacement amount of the tool T measured by the displacement meter 40, and the rotation angle of the workpiece W detected by the angular sensor 50 and temporarily stores the position command, the rotation angle of the workpiece W, and the surface displacement amount of the tool T in the storage unit 16 in correlation. The compensation amount calculating unit 14 calculates a shape error of the tool T with respect to a desired shape indicated by the position command for each rotation angle of the workpiece W on the basis of the position command corresponding to one rotation of the workpiece W and the surface displacement amount of the tool T stored in the storage unit 16. The shape error of the tool T includes an eccentricity amount of the center of the disk-shaped tool T with respect to the rotary axis of the tool T, for example.

The compensation amount calculating unit 14 obtains a compensation amount of the positional error on the basis of the calculated shape error of the tool T. The compensation amount calculating unit 14 temporarily stores the obtained compensation amount for each rotation angle corresponding to one rotation of the workpiece W in the storage unit 16.

As described above, the storage unit 16 stores the position command, the rotation angle of the workpiece W, and the surface displacement amount of the tool T in correlation. Moreover, the storage unit 16 stores the compensation amount for each rotation angle corresponding to one rotation of the workpiece W calculated by the compensation amount calculating unit 14.

The first compensation unit 18 compensates the positional error generated by the subtractor 12 for each rotation angle of the workpiece W on the basis of the compensation amount before one rotation of the workpiece W calculated by the compensation amount calculating unit 14 and stored in the storage unit 16.

In the machine tool controller 1 of the second embodiment, the displacement meter 40 measures the surface displacement amount of the tool T for each rotation angle of the workpiece W. Moreover, the servo control unit 10 capable of performing relatively high-speed control calculates a shape error of the tool T with respect to a desired workpiece shape for each rotation angle of the workpiece W on the basis of the surface displacement, amount of the tool T measured by the displacement meter 40, obtains a compensation amount of the positional error on the basis of the calculated shape error of the tool T, and compensates the positional error for each rotation angle of the workpiece W on the basis of the calculated compensation amount. In this way, the controller 1 can compensate the positional error on a real-time basis during machining of the workpiece W. Specifically, the servo control unit 10 stores the calculated compensation amount for each rotation angle corresponding to one rotation of the workpiece W during machining of the workpiece W and compensates the positional error on the basis of the stored compensation amount before one rotation of the workpiece W on a real-time basis. Due to this, according to the controller 1, it is possible to suppress decrease in machining accuracy of the machine tool resulting from an attachment error, a shape error (for example, an eccentricity of the center of the disk-shaped tool T with respect to the rotary axis of the tool T) of the tool T, or the like and to suppress increase in machining time.

Moreover, according to the machine tool controller 1 of the second embodiment, the learning control unit 20 and the second compensation unit 30 perform learning control so that the positional error decreases and further compensates the positional error on the basis of the learning compensation amount before one rotation of the workpiece W on a real-time basis. Therefore, it is possible to further suppress decrease in the machining accuracy of the machine tool resulting from an attachment error, a shape error of the tool T, or the like.

While the embodiments of the present invention have been described, the present invention is not limited to the above-described embodiments and various changes and modifications and combinations thereof may occur. For example, in the above-described embodiments, the machine tool controller 1 that relatively moves the workpiece W or the tool T by controlling the motor (a driving unit) 5 for moving the tool T to perform machining of the workpiece W has been described. However, the features of the present invention can be also applied to a machine tool controller that relatively moves the workpiece W or the tool T by controlling a motor (a driving unit) for moving the workpiece W to perform machining of the workpiece W.

EXPLANATION OF REFERENCE NUMERALS

1: Machine tool controller
2: Numerical controller (CNC)
3: Amplifier
5: Motor (driving unit)
6: Encoder
7: Ball screw
10: Servo control unit
12: Subtractor
14: Compensation amount calculating unit
16: Storage unit
18: First compensation unit
20: Learning control unit
22: Adder
24: Storage unit
30: Second compensation unit
32: Position control unit
34: Subtractor
36: Speed control unit
40: Displacement meter
50: Angular sensor T: Tool
W: Workpiece

What is claimed is:

1. A machine tool controller that relatively moves a workpiece or a tool while continuously rotating the workpiece to perform machining of the workpiece, the machine tool controller comprising:
   a servo control unit that generates a positional error based on a difference between a position command for moving the workpiece or the tool so that the workpiece is machined in a desired shape and a present position of the workpiece or the tool and generates a drive command for a driving unit that moves the workpiece or the tool on the basis of the positional error; and
   a displacement meter that measures a machining surface displacement amount of the workpiece for each rotation angle of the workpiece, wherein
   the servo control unit includes:
   a compensation amount calculating unit that calculates a shape error of the workpiece with respect to the desired shape for each rotation angle of the workpiece on the basis of the machining surface displacement amount measured by the displacement meter and obtains a compensation amount of the positional error on the basis of the calculated shape error of the workpiece; and
   a first compensation unit that compensates the positional error for each rotation angle of the workpiece on the basis of the compensation amount calculated by the compensation amount calculating unit,
   wherein the servo control unit further includes:
   a storage unit that stores the compensation amount for each rotation angle of the workpiece calculated by the compensation amount calculating unit, the compensation amount corresponding to one rotation of the workpiece, and
   wherein the first compensation unit compensates the positional error on the basis of the compensation amount before one rotation of the workpiece stored in the storage unit, and
   wherein the servo control unit includes:
   a learning control unit that generates a learning compensation amount by performing learning control so that the positional error decreases on the basis of the positional error compensated by the first compensation unit, the learning compensation amount before one rotation of the workpiece, and the rotation angle of the workpiece; and
   a second compensation unit that compensates the positional error compensated by the first compensation unit on the basis of the learning compensation amount learnt by the learning control unit.

2. A machine tool controller that relatively moves a workpiece or a tool while continuously rotating the workpiece and the tool to perform machining of the workpiece, the machine tool controller comprising:
   a servo control unit that generates a positional error based on a difference between a position command for moving the workpiece or the tool so that the workpiece is machined in a desired shape and a present position of the workpiece or the tool and generates a drive command for a driving unit that moves the workpiece or the tool on the basis of the positional error; and
   a displacement meter that measures a surface displacement amount of the tool for each rotation angle of the workpiece, wherein
   the servo control unit includes:
   a compensation amount calculating unit that calculates a shape error of the tool with respect to the desired shape for each rotation angle of the workpiece on the basis of the surface displacement amount measured by the displacement meter and obtains a compensation amount of the positional error on the basis of the calculated shape error of the tool; and
   a first compensation unit that compensates the positional error for each rotation angle of the workpiece on the basis of the compensation amount calculated by the compensation amount calculating unit,
   wherein the servo control unit includes:
   a learning control unit that generates a learning compensation amount by performing learning control so that the positional error decreases on the basis of the positional error compensated by the first compensation unit, the learning compensation amount before one rotation of the workpiece, and the rotation angle of the workpiece; and
   a second compensation unit that compensates the positional error compensated by the first compensation unit on the basis of the learning compensation amount learnt by the learning control unit.

3. The machine tool controller according to claim 2, wherein a rotation speed of the tool is an integer multiple of a rotation speed of the workpiece.

4. The machine tool controller according to claim 2, wherein the servo control unit further includes:
   a storage unit that stores the compensation amount for each rotation angle of the workpiece calculated by the compensation amount calculating unit, the compensation amount corresponding to one rotation of the workpiece, and
   wherein the first compensation unit compensates the positional error on the basis of the compensation amount before one rotation of the workpiece stored in the storage unit.

* * * * *